(12) United States Patent
Kwok et al.

(10) Patent No.: US 8,508,448 B2
(45) Date of Patent: Aug. 13, 2013

(54) METHOD AND APPARATUS FOR DRIVING REFLECTIVE BISTABLE CHOLESTRIC DISPLAYS

(75) Inventors: Hoi-Sing Kwok, Kowloon (HK); Fei-Hong Yu, Kowloon (HK); Qing-Cheng Li, Kowloon (HK); Wing-Chiu Yip, Chai Wan (HK)

(73) Assignee: The Hong Kong University of Science and Technology, Hong Kong (CN)

(*) Notice: Subject to any disclaimer, the term of this patent is extended or adjusted under 35 U.S.C. 154(b) by 1175 days.

(21) Appl. No.: 11/267,600

(22) Filed: Nov. 7, 2005

(65) Prior Publication Data

US 2006/0055650 A1    Mar. 16, 2006

Related U.S. Application Data

(63) Continuation of application No. 10/880,198, filed on Jun. 30, 2004, which is a continuation of application No. 09/071,202, filed on May 1, 1998, now abandoned.

(51) Int. Cl.
*G09G 3/36* (2006.01)
*G02F 1/1335* (2006.01)
*C09K 19/02* (2006.01)

(52) U.S. Cl.
USPC ............................ 345/87; 349/115; 349/185

(58) Field of Classification Search
USPC .................. 345/87–111, 115, 175, 176, 185
See application file for complete search history.

(56) References Cited

U.S. PATENT DOCUMENTS

| | | | |
|---|---|---|---|
| 4,571,585 A | | 2/1986 | Stein et al. |
| 4,759,614 A | * | 7/1988 | Yokokura et al. ............. 349/134 |
| 5,274,484 A | | 12/1993 | Mochizuki et al. |
| 5,570,216 A | | 10/1996 | Lu et al. |
| 5,625,477 A | * | 4/1997 | Wu et al. ......................... 349/35 |
| 5,661,533 A | | 8/1997 | Wu et al. |
| 5,748,277 A | | 5/1998 | Huang et al. |
| 5,889,566 A | | 3/1999 | Wu et al. |
| 5,933,203 A | | 8/1999 | Wu et al. |
| 5,943,035 A | | 8/1999 | Katakura |
| 6,154,190 A | | 11/2000 | Yang et al. |

OTHER PUBLICATIONS

Huang et al., "Dynamic drive for bistable reflective cholesteric displays: a rapid addressing scheme," The Society for Information Display 1995 International Symposium Digest of Technical Papers (SID 95 Digest), 347-350 (Mar. 1995).

Huang et al., "High performance dynamic drive scheme for bistable reflective cholesteric displays," The Society for Information Display 1996 International Symposium Digest of Technical Papers (SID 96 Digest), 359-363 (1996).

(Continued)

*Primary Examiner* — Srilakshmi K Kumar

(74) *Attorney, Agent, or Firm* — Leydig, Voit & Mayer, Ltd.

(57) ABSTRACT

This invention provides a method and apparatus for driving bistable cholesteric liquid crystal displays. The method and apparatus provided a display in which all the pixels are initially driven to the P state. Selected pixels for the display are then driven to the FC state to provide the desired message. The state of the pixels is then maintained for a viewing period prior to any resetting of the display to the P state. The switching from the P state to the FC state allows fast addressing times and lower voltages to be used in driving the display.

17 Claims, 5 Drawing Sheets

(56) References Cited

OTHER PUBLICATIONS

Lu, Bistable reflective cholesteric liquid crystal display, J. Appl. Phys., 81 (3): 1063-1066 (Feb. 1, 1997).

Pfeiffer et al., "A high information content reflective cholesteric display," The Society for Information Display 1995 International Symposium Digest of Technical Papers (SID 95 Digest), 706-709 (Mar. 1995).

Yang et al., "Cholesteric reflective display: drive scheme and contrast," Appl. Phys. Lett., 64 (15): 1905-1907 (Apr. 11, 1994).

* cited by examiner

METHOD AND APPARATUS FOR DRIVING REFLECTIVE BISTABLE CHOLESTRIC DISPLAYS

This application is a continuation of application Ser. No. 10/880,198, filed Jun. 30, 2004, which is continuation of application Ser. No. 09/071,202, filed May 1, 1998 (now abandoned).

BACKGROUND

1. Field of the Invention

This invention relates to bistable cholesteric displays and, in particular, although not necessarily solely, a method and apparatus for driving reflective bistable cholesteric displays.

2. Description of the Prior Art

Bistable cholesteric liquid crystal displays "BCD" are already well known and utilized in a number of applications. The bistable cholesteric display usually consists of two pieces of glass forming a thin liquid crystal cell. The liquid crystal material is usually composed of twisted nematic liquid crystal heavily doped with a chiral dopant to give the liquid crystal a strong twist sense or chirality. Such cholesteric liquid crystal displays exhibit two stable states at a zero driving voltage. The first of these is the reflective planar "P" state and, as the name suggests, is reflective in normal usage. The second state is the scattering/transparent focal conic (FC) state. In normal usage, the FC state is transparent.

When used in conjunction with a dark light absorber placed at the back of the display, the FC mate will appear black and the P state would appear to be bright when the display is viewed in reflection. The colour of the bright state can be adjusted by varying the chirality and pitch of the liquid crystal material. Such bistable liquid crystal displays are discussed in literature such as the monograph by S. Chandrasekhar entitled "Liquid Crystals" (Cambridge University Press, 1977).

A number of schemes have been developed to drive such bistable displays in a passive matrix manner. U.S. Pat. No. 4,571,585 by Stein et al. utilizes a wave form applied to the individual pixels which has been specially tailored in order to avoid cross talk problems. A number of voltage levels are needed for matrix driving of the display making the invention rather cumbersome. An alternative matrix driving scheme is disclosed in the document entitled "A High Information Content Reflective Cholesteric Display" (SID 95 Digest, 1995) by Pfeiffer et al. In this scheme, commercial LCD driver chips were used and the display was scanned with 20 ms pulses. An upper voltage of 41 V would give the P state and a lower voltage of 33 V would produce the FC state. The scanning of 20 ms per line was achieved. However, this scheme has the disadvantage of a high voltage requirement and the relative slowness in scanning.

A more complicated dynamic driving scheme is discussed in the document entitled "Cholesteric Reflective Display: Drive Scheme and Contrast" (Appl. Phys. Lett., 64, 1905, 1994) by Yang et al. In this scheme, a 1 ms addressing time was shown to be possible although was only provided at the expense of more complicated wave forms and driver electrons. Again, the voltages required were quite high at greater than 40 V.

A further drawback in the dynamic scheme of Yang et al. is the appearance of a dark band in the display. A yet further disadvantage is that the image does not appear instantaneously. Instead, there is a 300 ms delay due to the slow switching from the FC state to the P state. A yet further disadvantage is that the contrast ratio of the dynamic driving scheme is very te do the amplitude of the evolution voltage. The 1 ms addressing time shown to be possible at the expense of more complicated electronics is discussed in documents entitled "Dynamic Drive for Bistable Reflective Cholesteric Displays: A Rapid Addressing Scheme (SID 95 Digest, p. 347, 1995) and "High Performance Dynamic Drive Scheme for Bitable Reflective Cholesteric Displays" (SID 96 Digest, p. 359, 1996).

Faster switching to the P state has been demonstrated recently in a specially aligned BCD discussed in the document by M. H. Lu (Journal of Applied Physics, 81, 1063, 1997). Even with this faster switching available with a specially aligned BCD, it still takes approximately 10 ms for the switching.

OBJECT OF THE INVENTION

It is an object of the present invention to provide a method and apparatus for the driving of a bistable cholesteric liquid crystal display that can utilize simpler electrical wave forms and is capable of faster line addressing speed to overcome some of the disadvantages of the prior art or at least provide the public with a useful choice.

SUMMARY OF THE INVENTION

The present invention provides a method of driving a bistable cholesteric liquid crystal display comprising setting the display initially to the P state. Once the liquid crystal display has completely switched to the P state, the entire panel is scanned line by line in the same manner as in conventional passive matrix super twisted nematic LCDs to switch the selected pixels from the P state to the FC state. The non-selected pixels are allowed to remain in the P state.

The present invention also provides a bistable cholesteric liquid crystal display driven in this manner. The driver provides an initial pulse or pulse train to set or reset the display to the P state. The display contains a matrix of overlapping electrodes such that one set of electrodes may be driven by an address pulse and the second set of electrodes in the display driven with data pulses. The pixels defied by the overlapping regions between the two sets of electrodes are switched by the selected pixels receiving an address pulse and data pulse which are cumulative while the non-selected pixels receive a voltage of the address pulse minus the data pulse. Selection of the voltages are chosen such that the selected pixels will switch from the P state to the FC state and the non-selected pixels will remain in the P state.

In a final stage of the driving cycle, the display is allowed to stay without any driving voltages applied. This is the viewing phase of the driving scheme.

Further aspects of the invention may be considered novel when considered by those skill in the art to which the invention relates.

BRIEF DESCRIPTION OF THE DRAWINGS

The preferred embodiments of the invention will now be discussed with reference to the following drawings in which.

DETAILED DESCRIPTION OF PREFERRED EMBODIMENTS

Figure 1:
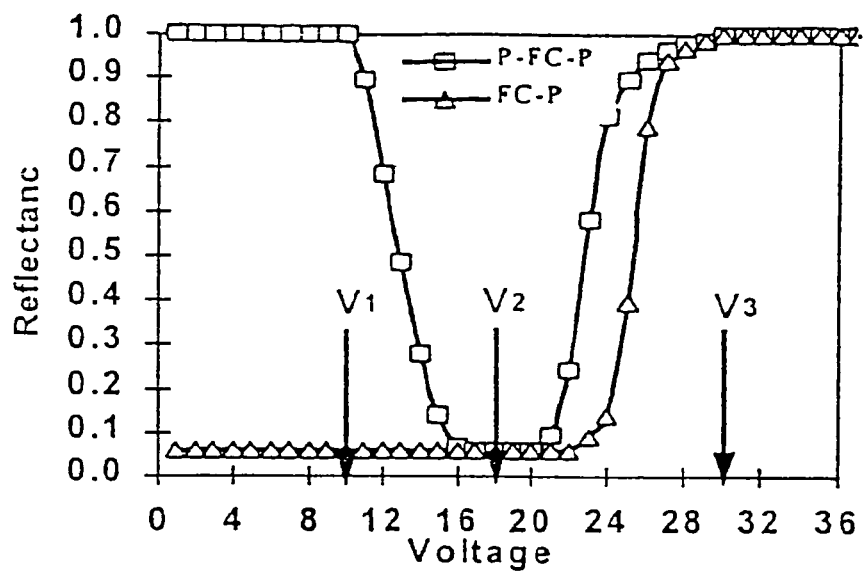
FIG. 1 shows a plot of the reflectance of a BCD cell against the voltage of the switching pulse.

The invention will now be described with reference to preferred embodiments and experimental embodiments.

This invention seeks to provide a driving method and apparatus for bistable cholesteric liquid crystal displays. The invention is based on the observation that whereas switching from the FC state to the P state of the cholesteric liquid crystal display takes 0.3 s, switching from the P state to the FC state can take less than 1 ms.

A preferred embodiment of the driving scheme sets the whole LCD panel to the P state by the application of either a single pulse or a pulse train with a duration of $T_r$ and an amplitude of $V_r$. This is referred to as the reset pulse. Typically, $T_r$ can be 20 ms and $V_r$ can be 40 V.

A time $T_p$ is allowed for the liquid crystal display to complete the switch to the P state. The entire LCD panel may then be scanned line by line in the same manner as conventional passive matrix super twisted nematic LCDs. Such LCDs typically provide a matrix of electrodes which are generally provided as two sets of substantially orthogonal electrodes. These will be referred to as horizontal address lines or horizontal rows and vertical data lines or vertical columns in the subsequent description. Of course, the exact arrangement of the electrodes may be varied in accordance with alternative structures without departing from the general application of the invention. The terms "horizontal" and "vertical" are used for convenience to refer to the different substantially perpendicular sets of electrodes in the preferred embodiment. They are not intended as a restriction to the spacial arrangement or alignment of the electrodes or the display itself.

In the preferred embodiment, the horizontal address lines are driven by address pulses of amplitude $V_g$ and a duration of $T_s$. The vertical data lines are driven with data pulses of amplitude $\pm V_d$ and duration $T_g$. The pixels in the display are provided by the overlapping regions of the electrodes. The selected pixels for the display are subjected to a voltage of $V_g+V_d$ while the non-elected pixels will receive a voltage of $V_g-V_d$. Selection of the values of $V_g$ and $V_d$ may be chosen such that the selected pixels are switched from the P state to the FC state on receiving the total of the voltages and the non-selected pixels are allowed to remain below the threshold in the P state.

The display may then be allowed to stay without any driving voltages applied. This is the viewing phase of the driving scheme. The viewing duration can be of any length and the viewing time may be periodic or irregular in duration.

Thus, in the overall driving scheme to refresh the display in the BCD in the preferred embodiment, there are three stages. The display may be refreshed or reset, subsequently scanned and the final stage is the viewing of the display.

It is observed that addressing time of $T_s$ of less than 1 ms per line is possible in a preferred embodiment. Such addressing time per line is already good enough for many applications such as the displays in pagers, cellular phones, personal data banks, etc. Even for a 100 line display panel, the total writing time is only 0.1 s at such an addressing speed. Furthermore, the scaring and data voltages may be kept quite low. In a preferred embodiment, the voltages $V_g$ and $V_d$ are 24 V and 6 V respectively. Such low voltages can be provided by commercial super twisted nematic liquid crystal display drivers.

In the preferred embodiment, the reset voltage $V_r$ may be the maximum high voltage required. This may generally fall in the range of 40 V to 25 V depending on the reset pulse duration required. For a 40 V reset pulse, the reset pulse duration can be as small as 10 ms. For a 25 V reset pulse, the reset pulse duration has to be somewhat longer, Furthermore, as the reset pulse need not be applied all to one electrode, it can be shared between the row and column or horizontal and vertical electrodes in order to reduce the voltage requirement. For applications which do not require frequent or fast resetting, the lower voltage may be preferred.

EXPERIMENTAL DATA AND EXAMPLE

To implement the method in a preferred embodiment, a low voltage cell has to be made. Several test cells were made. In a particular preferred embodiment, the cell gap of the sample LCD cell was 5 µm. The liquid crystal was provided with a homogeneous alignment and a mixture of a chiral dopant and ZLI 6204 were used in the sample cells. Although these are provided in the preferred embodiment, other nematic liquid crystals can also be used.

The response of the BCD cell to pulses of various voltages was measured using the following procedure. First the cell was driven to the reflective P state by a refresh pulse. The stabilized reflectance of the cell was measured as a function of the voltage of a switching pulse. This procedure was repeated with the cell in the FC state initially. Both the width of the applied switching pulse and the refresh pulse were 10 ms in this measurement. The pulse duration was changed in other measurements taken.

In this particular expert the central wave length of the incident light sources was 514 nm, The pitch of the BCD cell was adjusted to match that accordingly. As a result, the incident light is near perpendicular to the cell surface.

The results of this experiment are shown in FIG. 1. It can be seen that the curve P-FC-P represents the response of the cell originally in the P state prior to the application of the switching pulse. It can be observed that for voltages below 10 V, the reflection is not affected by the switching pulse. When the voltage of the pulse is between 10 V and 16 V, the reflection decreases approximately linearly with increasing voltage. Therefore, a stable gray scale can be obtained in this region. It can be noted that the reflectance of the cell reaches its original value when the voltage is above 30 V.

The other curve, FC-P, shows the switching behaviour of the cell when it was in the FC state prior to the switching pulse. In this case, the reflectance of the cell is unchanged by the switching pulse of amplitudes below 22 V. The cell is switched to the P state by voltages above 28 V. For both the FC-P and P-FC-P carves, the reflectance contrast between the FC and P states is about 20:1. This value is among the better values for BCDs as reported in prior literature. The voltage values of $V_1=10V$, $V_2=18V$ and $V_3=30V$ are lower than those reported in prior literature.

Figure 2:
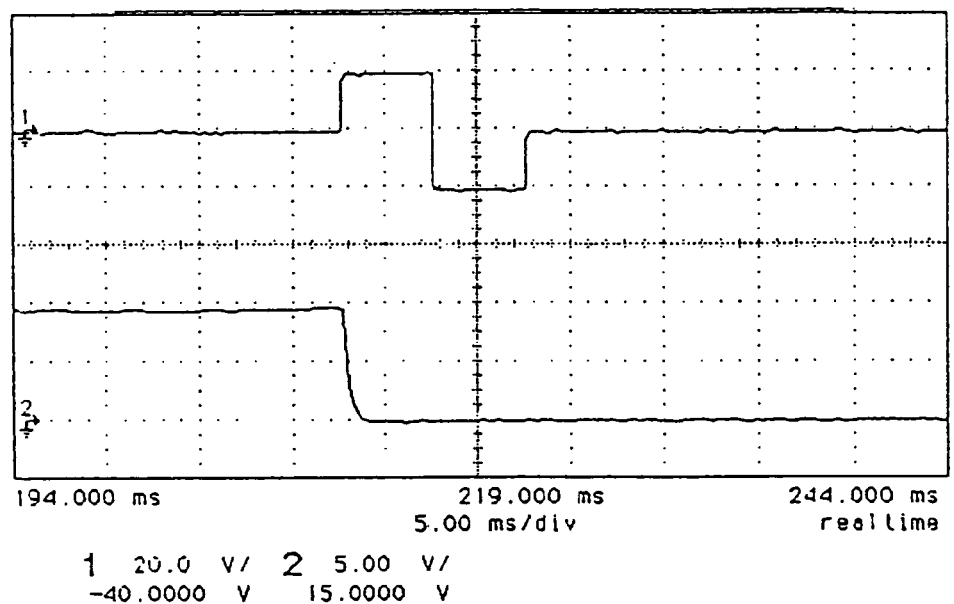
FIG. 2 provides a plot of the switching voltage against time to show the switching of the BCD from the P state to the FC state.

Referring now to FIG. 2, this Figure shows the temporal behaviour of the switching from the P to the FC state. The upper curve is the applied voltage while the lower curve shows the measure reflectance. It can be observed from FIG. 2 that swing from the P state to the FC state occurs early on in the pulse and is complete in approximately 1 ms. Although the switching time is shown to be 1 ms, the switching pulse cannot be reduced to 1 ms itself as yet. It was found that if the switching pulse was reduced to 1 ms, the reflectance would rise back up again. Instead, a holding voltage is needed to stabilize the FC state. As shown in FIG. 2 for this preferred embodiment, the holding voltage is provided by the 10 ms switching pulse itself.

In the driving scheme of this preferred embodiment reliance is provided on the column signal to bold the FC state after initial switching by a 1 ms pulse. In this example of a multiplex driving scheme, the pixel voltage consists of the difference between the scanning pulse train provided on the horizontal or row electrodes and the data pulse train provided on the vertical or column electrodes. As a result, the pixel voltage will have a noise-like data pulse train together with the selection pulse. These data pulses can be used to hold the FC state after the initial switching.

Figure 3:
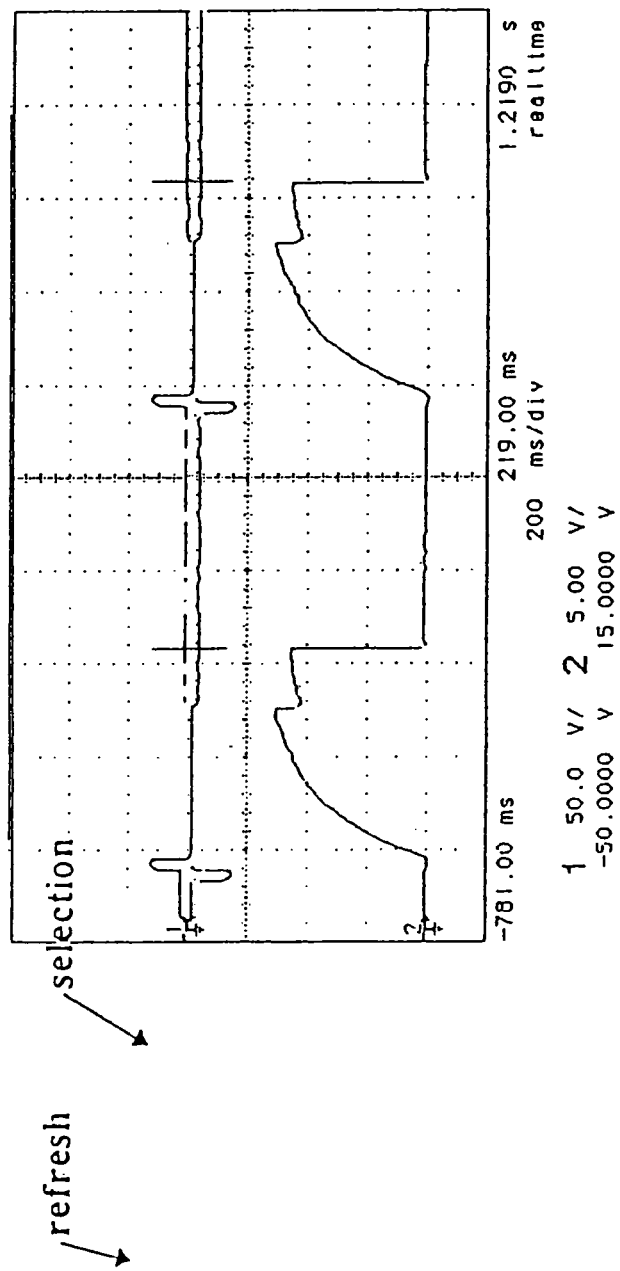
FIG. 3 is a plot showing the s o history between the P and FC states in an example of the invention.

The reflectance of a simulated selected pixel in this preferred embodiment is shown in FIG. 3. It can be seen that the pixel voltage consists of the initial 20 ms duration ±30 V refresh pulse which sets the pixel to the P state. This is followed with a 1 ms ±30 V switching pulse which is provided on top of a ±6 V background pulse train. This provides the switching and holding and it can be seen that the switching from the P to FC sates is complete with appropriate contrast.

Figure 4:
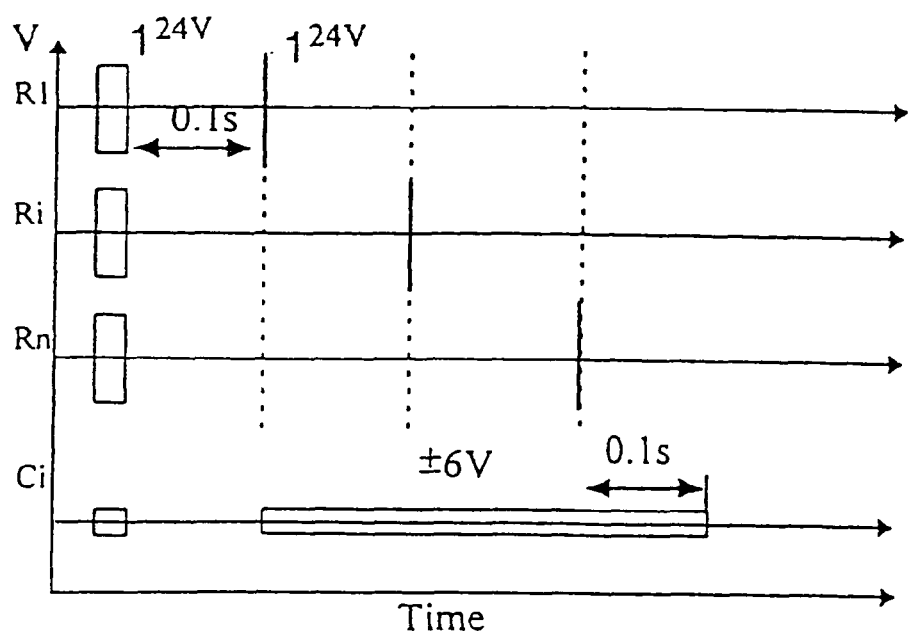
FIG. 4 shows an example of the timing sequence of a driving scheme in accordance with this invention.

In FIG. 4, a new driving scheme is shown for a binary BCD. Although gray scale is possible from the observed linear nature of the reflection shown in FIG. 1, the preferred embodiment discussed herein provides a simpler binary BCD. It should be noted that such a gray scale driving scheme may be provided utilizing this invention.

The preferred driving sine is shown in FIG. 4. According to the scheme, both the select and non-select pixels will see a 10-20 ms ±30 V pulse in the beginning. This is the reset pulse to refresh the display to a bright P state. Line by line scanning begins after a 0.1 & development time. In this multiplexing scheme, a select pixel will see the sum of the 1 ms address pulse (±24 V) and the data pulse (±6 V). As a result, the select pixels will see a ±6 V data train together with a 1 ms ±30 V selection pulse. This will cause the select pixels to switch to the FC state. In contrast, in the non-select pixel, the data pulse reverses sign. Therefore, the non-select pixels receive the same data train plus a 1 ms±18 V pulse. It is important to make sure that, in the particular embodiment provided, the P state is not affected by this non-selection pulse. The voltages arm chosen to allow the cumulative effect on selected pixels to exceed the threshold for sling to the FC state while the non-selected pixels do not exceed this threshold.

Figure 5:
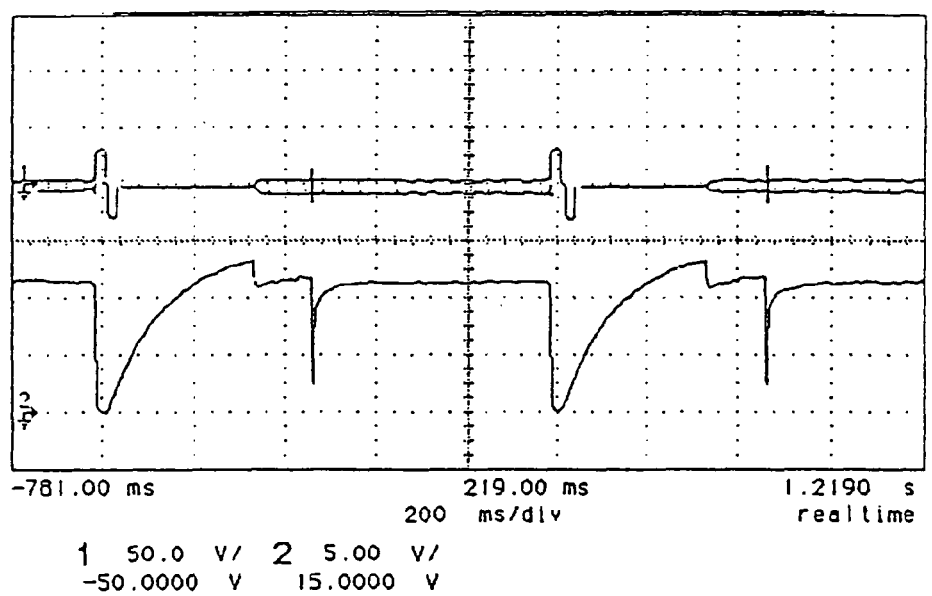
FIG. 5 is a plot showing the influence of the non-selection pulse train on the P state pixel.

Referring to FIG. 5, this figure shows the influence of the data pulse train and the 1 ms ±18 V pulse on the P state pixel for this preferred embodiment. It can be seen that the P state remains a P state. However, the reflectance has decreased by about 15%. This generally represents the cross a between the select and non-select pixels. Further optimization may be desirable to reduce this cross talk.

There appears to be a direct correlation between the duration of the switching pulse, i.e. the addressing speed, and the amount of cross talk. For long switching pulses, the voltage required for switching from P to FC states can be reduced. Therefore the P state will be less affected by the cross talk.

In a further example, a 2 ms pulse for switching from P to FC states was used. It was observed that there was a significant reduction in cross talk in this embodiment. Therefore, the ultimate selection of the addressing speed can be compromised against the brightness and contrast of the display. It is also noted that in this preferred example, the P state appears substantially robust against small voltage perturbations occurring during the scanning with 0.5 ms pulses. However, the Contrast and brightness are somewhat reduced.

Having scanned the display to select the pixels, this leaves the matters of the holding time and viewing time in this embodiment. Both are related to the last few lines of the panel.

Referring to FIG. 4, a 0.1 s±6 V pulse train is added to the end of the data pulse train. This is provided to stabilize the FC state for the last few lines of the panel where the 1 ms 30 V switching pulse appears at the end of the data pulse train. This holding pulse train can be reduced to 0.058 s in this preferred embodiment if necessary.

The viewing time is also needed for the Lot few lines of the panel. The last few lines of the panel are addressed last and pixel selection will appear at a time later than at the top of the screen. For example, for a 100-line display, the time difference is some 0.1 s. Therefore, a longer viewing time may be desirable between frames in order to equalize the brightness between the first and last parts of the screen to be addressed. In most applications of BCDs, the display does not have to be refreshed frequently. This is particularly the case for pagers, cellular phone displays and other such examples. Therefore, the difference of 0.1 s or even 1 s for a 1,000-line display does not appear to be a significant disadvantage.

Figure 6:
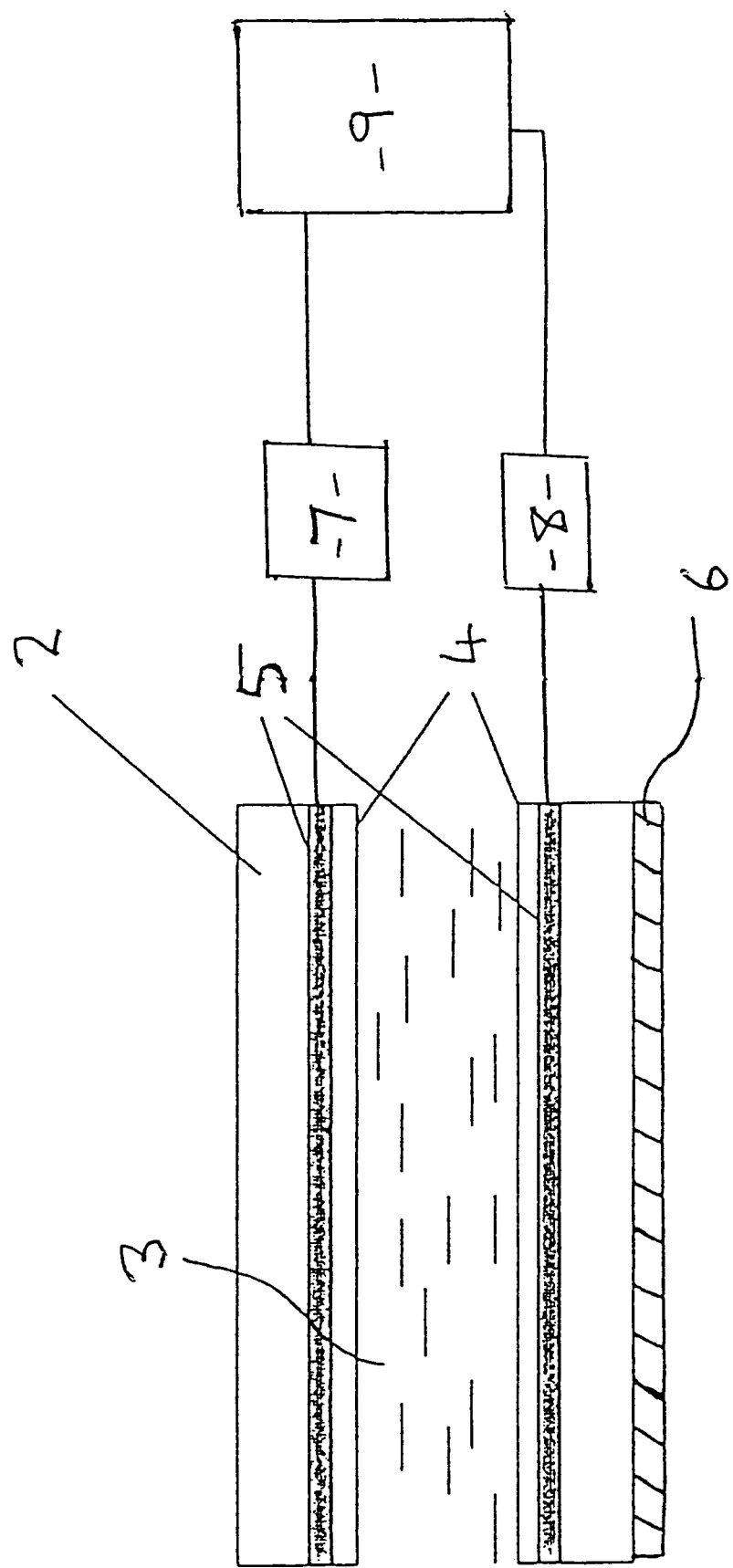
FIG. 6 is a cross sectional view through the basic structure of a liquid crystal display in accordance with one embodiment of the invention and, FIG. 7 shows an electrode pattern for inclusion in a BCD cell in accordance with a preferred embodiment of the invention.

The apparatus of this preferred embodiment may include a bistable cholesteric liquid display as shown in FIG. 6. FIG. 6 sets out the basic structure of such a liquid crystal display. Generally such displays comprise two pieces of glass or similar transparent material 2 between which the cholesteric liquid crystal material 3 is provided.

On either side of the liquid crystal material, there is provided a patterned electrode layer 5.

In many instances, although not necessary, an alignment layer 4 is provided on one or both sides of the crystal material.

When incorporated into a full display, a light absorbing black layer may be provided on the back of the liquid crystal display such as layer 6 in FIG. 6. Although a variety of light absorbing layers may be used, typically such layers comprise a layer of black cloth or velvet or even black paint or similar.

Figure 7:
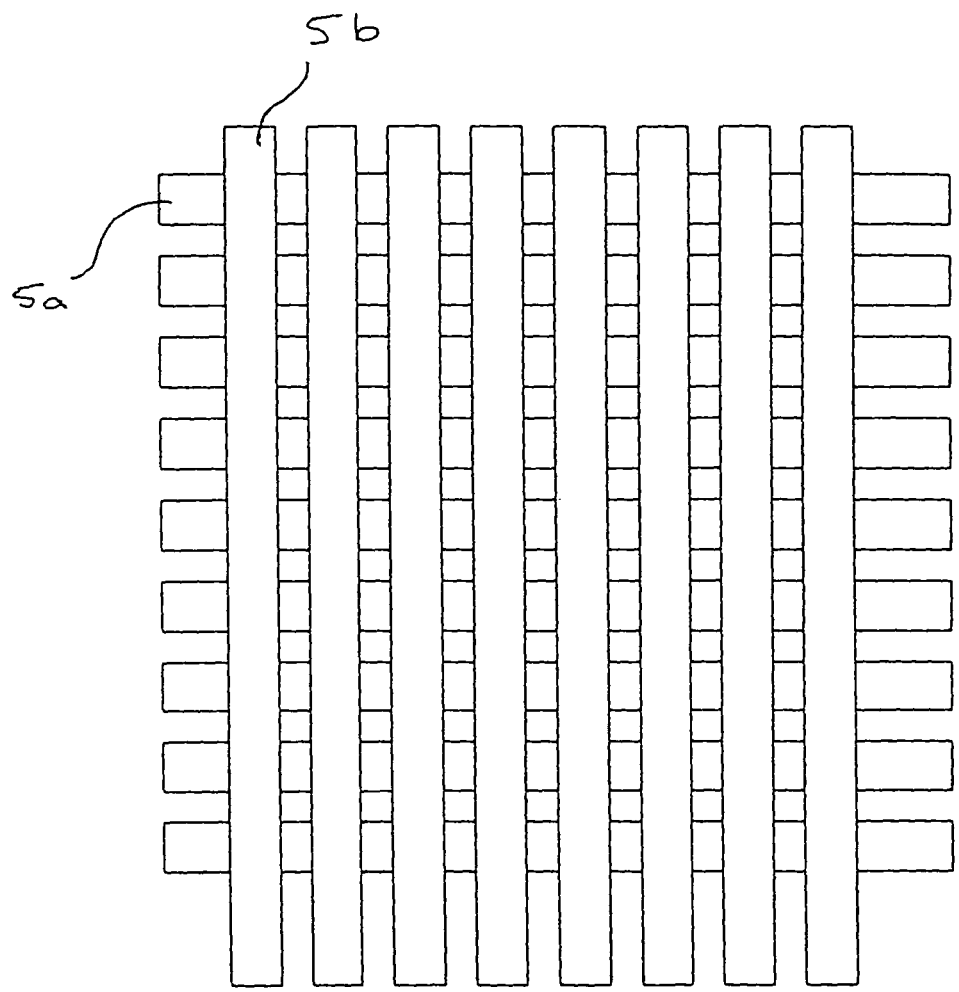

Referring to FIG. 7, the electrode pattern for a preferred embodiment is shown. The electrode pattern may provide a matrix of electrodes wherein the electrode layers on both sides of the liquid crystal material form a regular pattern of electrodes. As shown in this example in FIG. 7, an upper layer of electrodes 5A are provided as a series of substantially parallel electrodes and the lower layer 5B are again substantially parallel and substantially perpendicular to the upper level. The matrix itself provides a series of overlapping regions which may form the pixels of the display.

Although shown as substantially perpendicular rows and columns, the electrode pattern could be changed to form alternative pixel patterns and displays as desired.

Referring again to FIG. 6, each of the electrode layers receives electrical pulses from a suitable pulse generator 7 and 8. The pulse generators may be provided by a series of electrical or electronic components. An associated input control or processing means 9 may provide the desired signal to the electrical pulse generators 7 and 8 to display any particular message.

In general, the voltages provided to each of the row and column electrodes are periodic with each period corresponding to one frame of the display. Furthermore, the voltages within one frame period as provided by the drivers are divided into separate phases being the reset phase, data scanning phase and viewing phase.

In such liquid crystal displays, the electrodes 5A and 5B are provided by a transparent conductive film. Again, a number of materials may be utilized although indium tin oxide is common to form the pixilated display.

The optional alignment layer 4 is regularly provided by a coating of polymer on the transparent conductive films such that the polymer may provide alignment to the cholesteric liquid crystal.

The liquid crystal display cell gap can be chosen to suit the particular application. In this preferred embodiment, a cell gap range of 4 to 20 μm is sufficient.

It should also be noted that the drivers for the electrodes 7 and 8 may provide voltages in each frame period which invert in sign relative to an adjacent frame. The pulses provided may included a reset pulse duration of between 1 to 100 ms in this preferred example and the reset phase duration in this example may be 20 ms to 0.3 s. There is no requirement that the reset pulse duration and reset phase duration be the same.

The drivers 7 and 8 may provide reset voltages between 10 to 40 V in this embodiment. This need not be applied to a single electrode layer but instead may be the result of a reset pulse split between the electrodes, In any particular example, the reset pulse can be provided entirely on the row electrodes 5B or the column electrodes 5A with zero V on the other electrode respectively. Alternatively, it may be a result of a combination of voltages on the electrodes.

The address pulse and data pulse provided by the drivers 7 and 8 in this preferred example may be in the range of 0.5 to 10 ms in duration. This will provide a display wherein the data scanning phase may be 0.5 to 10 ms times the number of row electrodes in duration.

The preferred output of the address pulse voltage is approximately 24±3 V and the data pulse voltage is preferably approximately 6±2 V.

It may also be preferable that the row and column voltages may be biased by the same constant voltage within each frame. This can result in the same pixel voltage.

The viewing phase provided in the display may be longer than 0.1 s in duration for the preferred embodiment.

Although the time period consisting of the reset phase, data scanning phase and viewing phase can be referred to as periodic, this may not be a regular period. Instead, this may vary as required. As such, the liquid crystal display may be driven only on demand.

Thus it can be seen that this invention provides a method and apparatus for driving bistable cholesteric liquid crystal displays which, at least in a preferred form, is capable of 1 ms per line addressing speed. The actual addressing speed may be compromised to reduce cross talk or other matters according to the particular application. It can utilize simple electrical wave forms and relies on the faster switching from the P to FC states to provide the faster addressing speed. Although the display requires a reset to the P state, the invention may still be particularly useful for types of data displays where refreshing is not as frequent.

Specific items mentioned in this disclosure are deemed to incorporate equivalents known to those skill in the art to which the invention relates. This scope of the invention is not intended to be restricted by the described preferred embodiments but instead defined by the appended claims.

What is claimed is:

1. A bistable cholesteric liquid crystal display comprising:
    a plurality of pixels within said display;
    driving means to apply voltage to each pixel; and
    control means for controlling said driving means to supply a refresh pulse to said pixels to set all pixels to the reflective planar (P) state, to subsequently scan the plurality of pixels and supply a selection pulse to selected pixels to switch said selected pixels to the scattering/transparent focal conic (FC) state within about 0.5 ms to 2 ms without utilizing a surfactant within the bistable cholesteric liquid crystal display and to maintain said display for a period of time for viewing of the display.

2. A bistable cholesteric liquid crystal display as claimed in claim 1 wherein said display includes a matrix of overlapping electrodes with the pixels of the display being defined by overlapping regions of said matrix of electrodes.

3. A bistable cholesteric liquid crystal display as claimed in claim 2 wherein said matrix of overlapping electrodes comprises a first set of electrodes and a second set of electrodes with the pixels defined by the overlapping regions between said first and second sets of electrodes and wherein the refresh pulse from the driving means is provided to said electrodes to drive all said pixels to the P state.

4. A bistable cholesteric liquid crystal display as claimed in claim 3 wherein the voltage supplied to the pixels for the display comprises providing an address voltage to one set of electrodes and a data voltage to the remaining set of electrodes such that selected pixels receive a cumulative total of said voltages and non-selected pixels receive a data voltage of opposite sign to provide a lower total voltage to non-selected pixels.

5. A bistable cholesteric liquid crystal display as claimed in claim 4 wherein said address pulse voltage is approximately 24±3V.

6. A bistable cholesteric liquid crystal display as claimed in claim 4 wherein said data pulse voltage is approximately 6±2V.

7. A bistable cholesteric liquid crystal display as claimed in claim 1 wherein said electrodes comprise transparent conductive film.

8. A bistable cholesteric liquid crystal display as claimed in claim 7 wherein said transparent conductive film comprises indium tin oxide.

9. A bistable cholesteric liquid crystal display as claimed in claim 1 wherein said liquid crystal cell has a gap of 4 to 20 μm.

10. A bistable cholesteric liquid crystal display as claimed in claim 1 wherein the liquid crystal display is driven only on receipt of a signal by the control means.

11. A bistable cholesteric liquid crystal display as claimed in claim 1 wherein said display is incorporated in a pager or cellular telephone.

12. A method of driving a bistable cholesteric liquid crystal display comprising the steps of:
    providing a refresh pulse to set all pixels to the reflective planar (P) state;
    switching selected pixels to provide the desired pattern to the scattering/transparent focal conic (FC) state within about 0.5 to 2 ms without utilizing a surfactant within the bistable cholesteric liquid crystal display; and
    holding said display for a suitable viewing period.

13. A method of driving a bistable cholesteric liquid crystal display as claimed in claim 12 wherein said method comprises providing electrical pulses to column and row electrodes to impart a voltage on the cholesteric liquid crystal material in each pixel to drive the switching between the P state and the FC state.

14. A method of driving a bistable cholesteric liquid crystal display as claimed in claim 13 wherein said refresh pulse is in the range of 10 to 40 V.

15. A method of driving a bistable cholesteric liquid crystal display as claimed in claim 13 wherein said step of providing electrical pulses to electrodes to switch said selected pixels to the FC state to provide said display comprises driving one set of electrodes with an address pulse and the remaining set of electrodes with data pulses such that the selected pixels are subjected to a voltage being the sum of the address and data pulses which is greater than the threshold voltage to switch to the FC state and the non-selected pixels receive a voltage with a data pulse of inverse sign at a voltage below the threshold for switching to the FC state.

16. A method of driving a bistable cholesteric liquid crystal display as claimed in claim 13 wherein said viewing phase comprises applying insufficient voltages to any pixels to cause a change from the P state to the FC state.

17. A bistable cholesteric liquid crystal display for switching pixels between a first stable state and a second stable state, comprising:
- a plurality of pixels;
- driving means for applying voltage to each pixel; and
- control means for controlling said driving means to supply a refresh pulse to said plurality of pixels to place said plurality of pixels in a first stable state, to subsequently scan the plurality of pixels and supply a selection pulse to selected pixels of said plurality of pixels in the first stable state to switch said selected pixels to a second bistable state within about 0.5 ms to 2 ms without utilizing a surfactant within the bistable cholesteric liquid crystal display to provide a desired pattern, and maintaining said display in the second bistable state for a period of time for viewing of the display;
- wherein said first stable state is the Planar (P) state and said second stable state is the Focal Conic (FC) state.

* * * * *

UNITED STATES PATENT AND TRADEMARK OFFICE
CERTIFICATE OF CORRECTION

PATENT NO. : 8,508,448 B2
APPLICATION NO. : 11/267600
DATED : August 13, 2013
INVENTOR(S) : Kwok et al.

It is certified that error appears in the above-identified patent and that said Letters Patent is hereby corrected as shown below:

In the drawings, Sheet 2, Fig. 3, the words "refresh" and "selection" and arrows corresponding thereto should be aligned as follows:

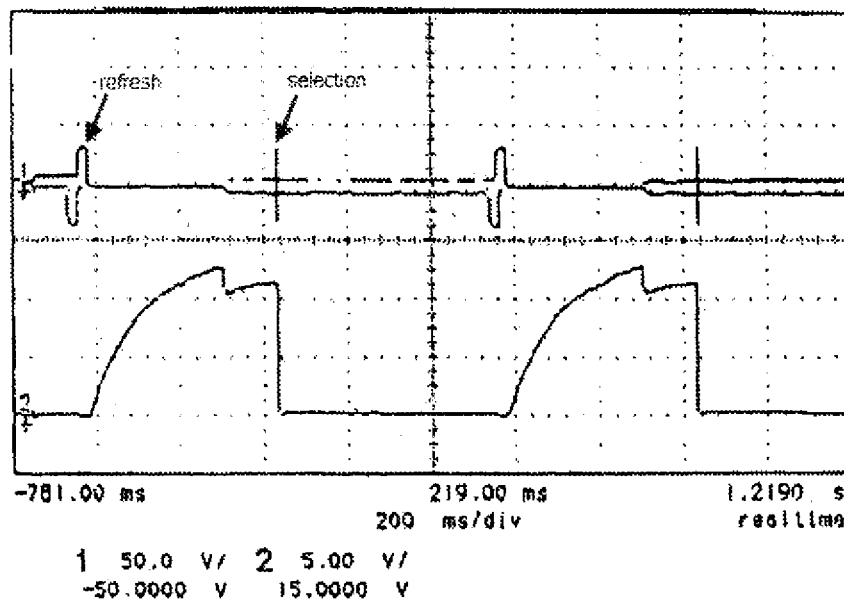

FIG. 3

In the Specification:

col. 1, line 30: "FC mate" should read --FC state--.

col. 2, line 1: "is very te do" should read --depends on--.

col. 2, line 42: "defied" should read --defined--.

Signed and Sealed this
Twenty-fifth Day of February, 2014

Michelle K. Lee
*Deputy Director of the United States Patent and Trademark Office*

CERTIFICATE OF CORRECTION (continued)
U.S. Pat. No. 8,508,448 B2 col. 2, line 66: "the s o history" should read --the history--.

col. 4, line 3: "scaring" should read --scanning--.

col. 4, line 39: "expert" should read --experiment--.

col. 4, line 58: "P-FC-P carves" should read --P-FC-P curves--.

col. 5, line 10: "to bold" should read --to hold--.

col. 5, line 33: "driving sine" should read --driving scheme--.

col. 5, lines 46-47: "arm chosen" should read --are chosen--.

col. 5, line 48: "sling" should read --swing--.

col. 5, line 54: "the cross a between" should read --the cross talk between--.